(12) United States Patent
Grondzik

(10) Patent No.: US 8,102,793 B2
(45) Date of Patent: Jan. 24, 2012

(54) MOBILE WIRELESS INTERNET SERVICE PROVIDER SYSTEM

(76) Inventor: James T. Grondzik, St. Augustine, FL (US)

( * ) Notice: Subject to any disclaimer, the term of this patent is extended or adjusted under 35 U.S.C. 154(b) by 879 days.

(21) Appl. No.: 12/150,376

(22) Filed: Apr. 28, 2008

(65) Prior Publication Data

US 2009/0268650 A1 Oct. 29, 2009

(51) Int. Cl.
*H04B 7/14* (2006.01)

(52) U.S. Cl. .......................... 370/315; 370/401

(58) Field of Classification Search .................. 370/310, 370/315, 328, 338, 334, 401
See application file for complete search history.

(56) References Cited

U.S. PATENT DOCUMENTS

| | | | | |
|---|---|---|---|---|
| 7,224,936 B2 * | 5/2007 | Pearson | .................. | 455/11.1 |
| 2004/0053602 A1 * | 3/2004 | Wurzburg | .................. | 455/412.1 |
| 2005/0135299 A1 * | 6/2005 | Bishop et al. | .................. | 370/328 |
| 2006/0083186 A1 * | 4/2006 | Handforth et al. | .................. | 370/310 |
| 2008/0080364 A1 * | 4/2008 | Barak et al. | .................. | 370/210 |
| 2008/0267142 A1 * | 10/2008 | Mushkin et al. | .................. | 370/338 |
| 2008/0279134 A1 * | 11/2008 | Lee | .................. | 370/315 |
| 2009/0159677 A1 * | 6/2009 | Yakimov et al. | .................. | 235/439 |

* cited by examiner

*Primary Examiner* — Brian Nguyen

(57) ABSTRACT

The system includes a waterproof housing enclosing selected apparatus, which may include a modem for receiving a signal from an ISP and providing an output signal, and a wireless router for receiving the output signal from the modem and providing an output signal, a first antenna receiving a signal from an ISP and providing the signal to the modem, and a second antenna receiving the output signal from the wireless router and transmitting the output signal, and a rechargeable battery power supply that provides electrical power. Another antenna and another modem provide another output signal to the wireless router. A standard FCC wireless receiver mounted in the router provides a wired or wireless LAN access point. Two more modems and another wireless router may be provided in the housing, as well as POE input and a solar panel for battery charging.

18 Claims, 2 Drawing Sheets

MOBILE WIRELESS INTERNET SERVICE PROVIDER SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field or the Invention

The present invention relates to a wireless self-contained mobile Internet service provider system including multiple dedicated modems and wireless routers.

2. Relevant Art

Wireless modems and routers for use with Internet Service Providers (ISPs) are well-known to the art. It is also well known that under emergency conditions a particular communication setup may be impaired or become inoperable. What is desired is a communication system that is a mobile and self-contained unit and connects to one or more ISPs that are selectable based upon availability in the circumstances. In addition, the unit should also be capable of broadcasting, preferably in wireless mode, to allow users to access ISP information at locations remote from the unit.

None of the communication units of the prior art seem to be satisfactory for use in the emergency conditions and business continuity planning as contemplated by the present system, and/or anywhere that structured communication or power is unavailable.

BRIEF SUMMARY OF THE INVENTION

This invention is directed to a mobile wireless Internet Service Provider system including a housing having inside and outside surfaces and an interior space therein for enclosing selected apparatus therein. The apparatus in the interior space includes at least one modem for receiving a signal from an ISP and providing an output signal, and at least one wireless router for receiving the output signal from at the least one modem and providing an output signal. The housing carries a first antenna adjacent the outside surface of the housing to receive a signal from at least one ISP and provide the signal to at least one modem. A second antenna is carried by the housing adjacent its outside surface for receiving the output signal from the at least one wireless router and transmitting the output signal. A power supply means provides electrical power to the selected apparatus of the system.

Several aspects of the invention include another modem in the housing for receiving a signal from the ISP and another receiver antenna mounted on the outside surface and operationally connected to the another modem for providing a signal from the ISP to the another modem, the another modem providing an output signal to the at least one wireless router. A standard FCC wireless receiver is mounted in the at least one wireless router for providing a wired or wireless LAN access point. The power supply means includes at least one rechargeable battery.

Further aspects of the invention have the antennas mounted to the outside surface of the housing with weatherproof enclosure seals for protection of the interior space of the housing and the selected apparatus. Another modem is disposed in the housing for receiving a signal from the ISP, and such another modem provides an output signal to the at least one wireless router. The power supply means includes an AC power input and power transfer circuitry to provide for either AC or DC power for the selected apparatus in the housing. A Power-Over-Ethernet input provides electric power for auxiliary devices associated with said housing.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
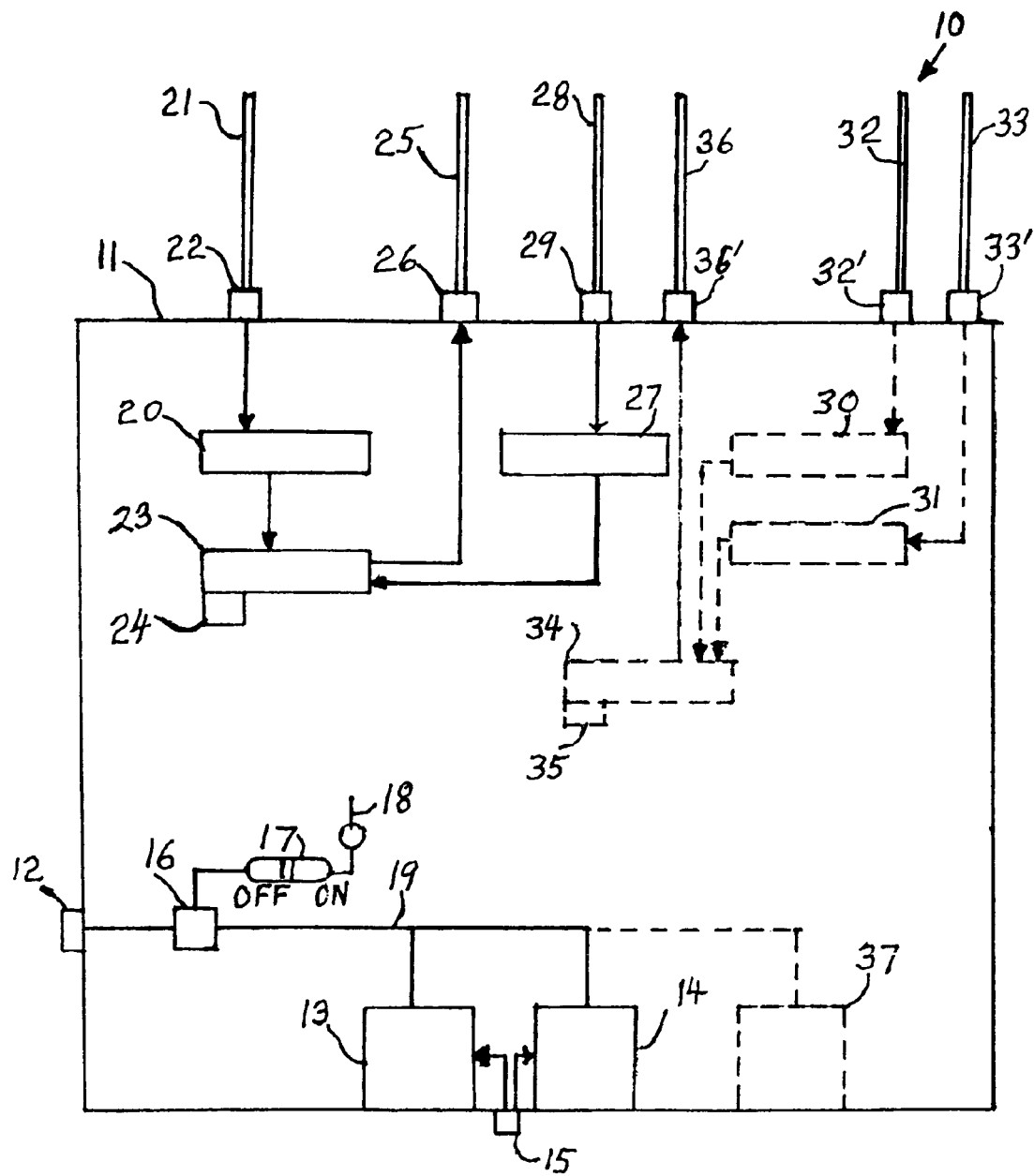
FIG. 1 is a pictorial illustration of the mobile wireless Internet Service Provider system in accord with this invention.

With respect to the drawings, the mobile wireless ISP system is shown generally at 10 in FIG. 1. An all-weather housing or enclosure 11 is designed to protect apparatus inside in hot or cold environments and to protect against theft and vandalism.

Electricity can be supplied to components inside the enclosure 11 via external power input 12 which includes an appropriate all-weather seal as understood in the art. In the preferred embodiment, two rechargeable batteries 13 and 14 are provided. Recharging is done via input 15, which also includes an all-weather seal. Battery wires 19 attach AC/battery switch 16 that provides power supply sensing and signal conditioning, which includes power transfer for automatic power control as understood in the art. Power lines 18 provide power via on/off switch 17 to the various components within enclosure 11. The exact configuration of the overall power supply depends on the circumstances and the levels of redundancy needed and also depends on the specifics of a given application.

First modem 20 is connected to antenna 21 through enclosure seal 22. Antenna 21 is designed for reception of 3G or 4G cellular, Clearwire, satellite, Wimax, EVDO and other Internet signals. Modem 20 is also designed for the specific Internet signal used. Modem 20 provides the received signal to a first wireless router 23 which provides a wireless LAN access point and includes either (1) an FCC standard wireless receiver A, B, G or N LAN card (wireless network adapter) or compatible future wireless standards or (2) a hard-wired connection such as a RJ45 jack. The card option is illustrated by numeral 24. The router 23 provides a signal to antenna 25 through enclosure seal 26. Antenna 25 broadcasts the Internet signal a distance of approximately 100+ yards.

A second modem 27 receives a signal via antenna 28 through enclosure seal 29 and provides the signal to router 23. One wireless router, such as router 23, can handle two modems 20, 27, each of which require a separate respective dedicated antenna 21, 28. If third and fourth modems 30, 31 are used in the enclosure 11, a second wireless router 34 must be employed with LAN card 35 and the associated antennas 32, 33, 36 attachable via respective enclosure seals 32', 33', 36'. An additional battery 37 may be necessary to power such additional equipment.

Figure 2:
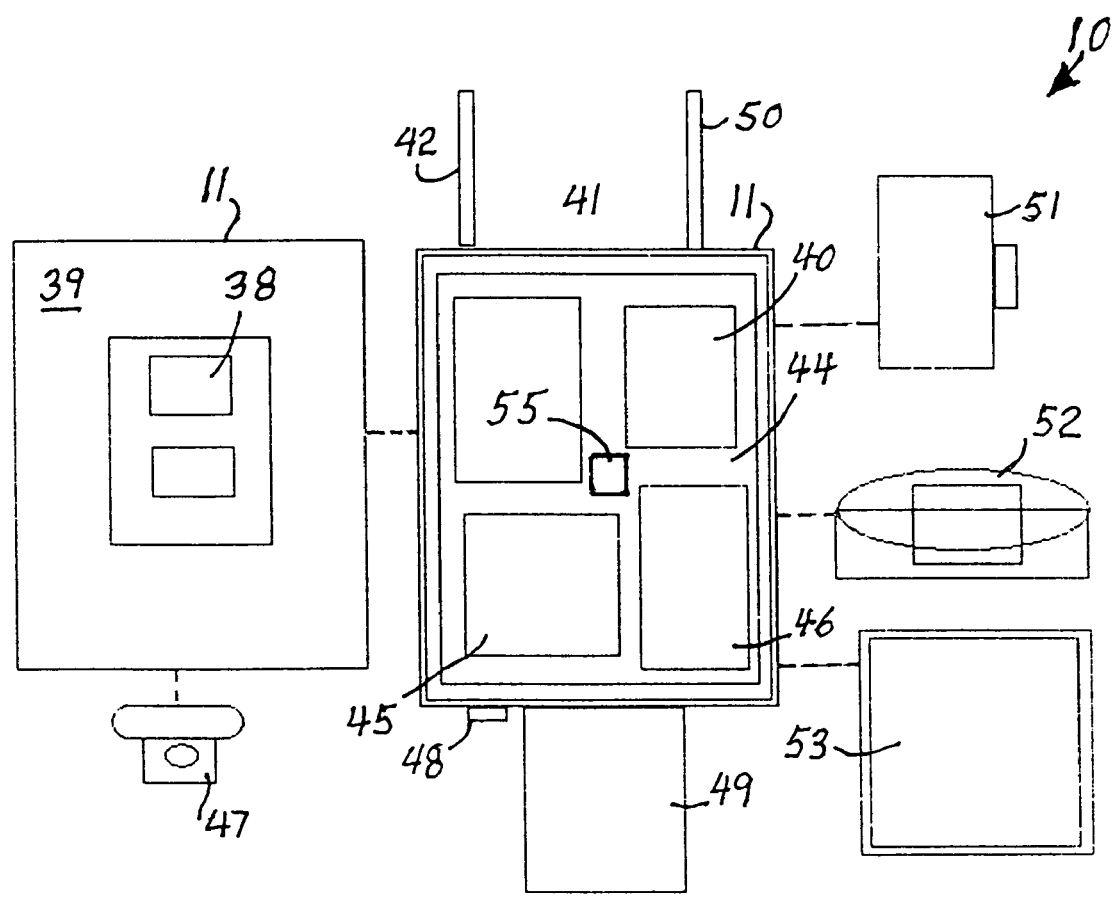
FIG. 2 is another pictorial illustration of the invention depicted in FIG. 1.

FIG. 2 is pictorial diagram of the system 10 illustrating additional features of the invention. Enclosure 11 is an all-weather housing that can be specifically made for specific environments such as subzero temperatures or corrosive atmospheres and the like. In addition, the enclosure 11 can be adapted for 220vac and European applications, if desired. A hot climate equipment cooling unit 38 may be mounted on the front NEMA cover 39 to cool and control the internal temperature of the enclosure 11 and generally will be used when additional modems 27, 30, 31 and router 34 are within enclosure 11. A Power-Over-Ethernet (P.O.E.) Wi-Fi router/A.P. Bridge with RJ 45 LAN output unit 40, includes, for example, router 23 and LAN card 24 from FIG. 1.

Modem unit 41 represents the mounting of the modems used which includes, for example, modems 20 and 27 from FIG. 1. Antenna 42 can be Omni or directional if needed and may include appropriate technology to handle several different frequencies if needed. Back plate 44 can be pre-drilled to carry equipment as desired. Internal unit 45 represents other optional items such as Lojack, cameras, spare parts, and other power devices. Power supply unit 46 includes sensing and power transfer circuitry in addition to the batteries which includes batteries 13, 14 and 37 from FIG. 1. Unit 47 includes a P.O.E. camera with low light capability that can be used for security of the system 10 as well as the surroundings in the form of recon uses. Power enclosure seals are represented by element 48. The unit 10 may be mounted off the ground or to a pole with mounting apparatus 49. Antenna 50 can be for Wi-Fi or any other technology as desired in the circumstances. An additional antenna array 51 can be used for data traffic control and may include a panel antenna to enhance strength and direction of the received signal from the user's device. Satellite dish receiver 52 can be mounted to the unit housing 11 if needed. An additional option includes a solar panel 53 for power backup or for more power if needed. Further, the solar panel 53 may provide the sole power for the unit with battery storage and use during non-solar power production. A charge controller 55 is provided within the housing 11 to receive power from the solar panel and from the AC power input through seal 48.

The principal feature of the present system 10 is a mobile wireless self-contained ISP that can interface with and relay signals associated with a plurality of ISP's in areas where a specific wireless provider may not be available whereas one or more other ISP's are. Also, if structured communication or power is unavailable, the present system 10 can be employed to provide Internet access. Accordingly, the use of optional equipment and the number of modems and routers are to be chosen by the user.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A mobile wireless Internet Service Provider system comprising
   A. a housing having inside and outside surfaces and an interior space therein for enclosing selected apparatus, said housing being readily movable from one location to another location to provide ISP services to multiple users within range of said housing and said selected apparatus therein,
   B. said selected apparatus including
      a) at least one modem for receiving a signal from an ISP and providing an output signal, and
      b) at least one wireless router for receiving said output signal from said at least one modem and providing an output signal,
   C. said housing including
      a) a first antenna carried by said housing adjacent said outside surface for receiving a signal from at least one ISP and providing said signal to said at least one modem, and
      b) a second antenna carried by said housing adjacent said outside surface for receiving said output signal from said at least one wireless router and transmitting said output signal, and
   D. power supply means within said housing for providing electrical power to said selected apparatus of said system.

2. The system as defined in claim 1 further including another modem in said housing for receiving a signal from said ISP and another receiver antenna mounted on said outside surface and operationally connected to said another modem for providing a signal from said ISP to said another modem, said another modem providing an output signal to said at least one wireless router.

3. The system as defined in claim 2 wherein said power supply means includes an AC power input and power transfer circuitry to provide for either AC or DC power for said selected apparatus in said housing.

4. The system as defined in claim 1 further including a standard FCC wireless receiver mounted in said at least one wireless router for providing a wired or wireless LAN access point.

5. The system as defined in claim 1 wherein said power supply means includes at least one rechargeable battery.

6. The system as defined in claim 1 wherein said antennas are mounted to said outside surface of said housing with weatherproof enclosure seals for protection of said interior space of said housing and said selected apparatus.

7. The system as defined in claim 1 further including another modem in said housing for receiving a signal from said ISP and said another modem provides a signal to said at least one wireless router.

8. The system as defined in claim 1 wherein said power supply means includes an AC power input and power transfer circuitry to provide for either AC or DC power for said selected apparatus in said housing.

9. The system as defined in claim 1 further including a Power-Over-Ethernet input for providing electric power for auxiliary devices associated with said housing.

10. The system as defined in claim 1 wherein said housing is a weatherproof enclosure to provide protection for said interior space of said housing and said selected apparatus.

11. A mobile wireless Internet Service Provider system comprising
   A. a housing having inside and outside surfaces and an interior space therein for enclosing selected apparatus, said housing being readily movable from one location to another location to provide ISP services to multiple users within range of said housing and said selected apparatus therein, B. said selected apparatus including
   a) a pair of modems for receiving signals from different ISPs and providing output signals, and
   b) one wireless router for receiving said output signals from said modems and providing output signals,
C. said housing including
   a) a pair of spaced antennas carried by said housing adjacent said outside surface for respectively receiving signals from different ISPs and providing output signals to respective said modems, and
   b) a third antenna carried by said housing adjacent said outside surface and spaced from each of said pair of spaced antennas for receiving said output signals from said wireless router and transmitting said output signals, and
D. power supply means within said housing for providing electrical power to said selected apparatus of said system.

12. The system as defined in claim 11 further including another pair of modems in said housing for receiving signals from other different ISP's and another pair of spaced antennas mounted on said outside surface and operationally connected to respective said another pair of modems for providing signals from said other different ISP's to respective said another pair of modems, and another wireless router, said another pair of modems providing output signals to said another wireless router.

13. The system as defined in claim 12 further including a standard FCC wireless receiver mounted in said one wireless router for providing a wired or wireless LAN access point.

14. The system as defined in claim 12 wherein all said antennas are mounted to said outside surface of said housing with weatherproof enclosure seals for protection of said interior space of said housing and said selected apparatus.

15. The system as defined in claim 11 wherein said power supply means includes at least one rechargeable battery.

16. The system as defined in claim 15 further including a solar panel for recharging said at least one rechargeable battery.

17. The system as defined in claim 11 wherein said power supply means includes an AC power input and power transfer circuitry to provide for either AC or DC power for said selected apparatus in said housing.

18. The system as defined in claim 11 further including a Power-Over Ethernet input for providing electric power for auxiliary devices associated with said housing.

* * * * *